(12) United States Patent
Nakamura et al.

(10) Patent No.: US 12,737,039 B2
(45) Date of Patent: Sep. 15, 2026

(54) DISPLAY CONTROL APPARATUS

(71) Applicant: NTT DOCOMO, INC., Tokyo (JP)

(72) Inventors: Yuki Nakamura, Chiyoda-ku (JP); Yasuo Morinaga, Chiyoda-ku (JP); Mitsuhiro Goto, Chiyoda-ku (JP); Tatsuya Nishizaki, Chiyoda-ku (JP); Takaya Hasegawa, Chiyoda-ku (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 19/106,047

(22) PCT Filed: Aug. 3, 2023

(86) PCT No.: PCT/JP2023/028418
§ 371 (c)(1),
(2) Date: Feb. 24, 2025

(87) PCT Pub. No.: WO2024/048195
PCT Pub. Date: Mar. 7, 2024

(65) Prior Publication Data

US 2026/0064194 A1 Mar. 5, 2026

(30) Foreign Application Priority Data

Sep. 2, 2022 (JP) ................................. 2022-139770

(51) Int. Cl.
*G06F 3/01* (2006.01)
*G06F 3/0346* (2013.01)

(52) U.S. Cl.
CPC .............. *G06F 3/012* (2013.01); *G06F 3/014* (2013.01); *G06F 3/0346* (2013.01); *G06F 2203/0331* (2013.01)

(58) Field of Classification Search
CPC ........ G06F 3/012; G06F 3/014; G06F 3/0346; G06F 2203/0331; G06F 1/1694; G06F 3/04886
(Continued)

(56) References Cited

U.S. PATENT DOCUMENTS

2017/0052701 A1* 2/2017 Rosenfeld ........... G06F 3/04886
2022/0137705 A1* 5/2022 Hashimoto ........... G06F 1/1694 345/156

FOREIGN PATENT DOCUMENTS

JP 2017-27206 A 2/2017
JP 2018-61666 A 4/2018
(Continued)

OTHER PUBLICATIONS

International Search Report issued on Sep. 26, 2023, in PCT/JP2023/028418 filed on Aug. 3, 2023, therein 4 pages (with English translation).

(Continued)

*Primary Examiner* — Abdul-Samad A Adediran
(74) *Attorney, Agent, or Firm* — Oblon, McClelland, Maier & Neustadt, L.L.P.

(57) ABSTRACT

A display control apparatus includes a display controller and a determiner. The display controller is configured to cause a pair of glasses device to display one or more virtual objects included in a field of view of the pair of glasses device in a three-dimensional space and to, based on a line of sight of a user of the pair of glasses device, cause the pair of glasses device to display a virtual indicator for selecting one virtual object from the one or more virtual objects. The determiner is configured to determine, to be a target for operation, a virtual object indicated by the virtual indicator at a point in time at which an input operation to a wearable terminal device worn on a body of the user is performed.

9 Claims, 10 Drawing Sheets

(58) Field of Classification Search
USPC .......................................................... 345/156
See application file for complete search history.

(56) References Cited

FOREIGN PATENT DOCUMENTS

| | | | |
|---|---|---|---|
| JP | 2018-61667 | A | 4/2018 |
| JP | 2021-60627 | A | 4/2021 |
| JP | 7126583 | B1 | 8/2022 |

OTHER PUBLICATIONS

Japanese Office Action issued Aug. 5, 2025 in Japanese Patent Application No. 2024-544065 (with unedited computer-generated English translation), 8 pages.

* cited by examiner

S
A
B
VOB1
VOB2
θ
O
VOB3
VOB6
VOB4
VOB5
R

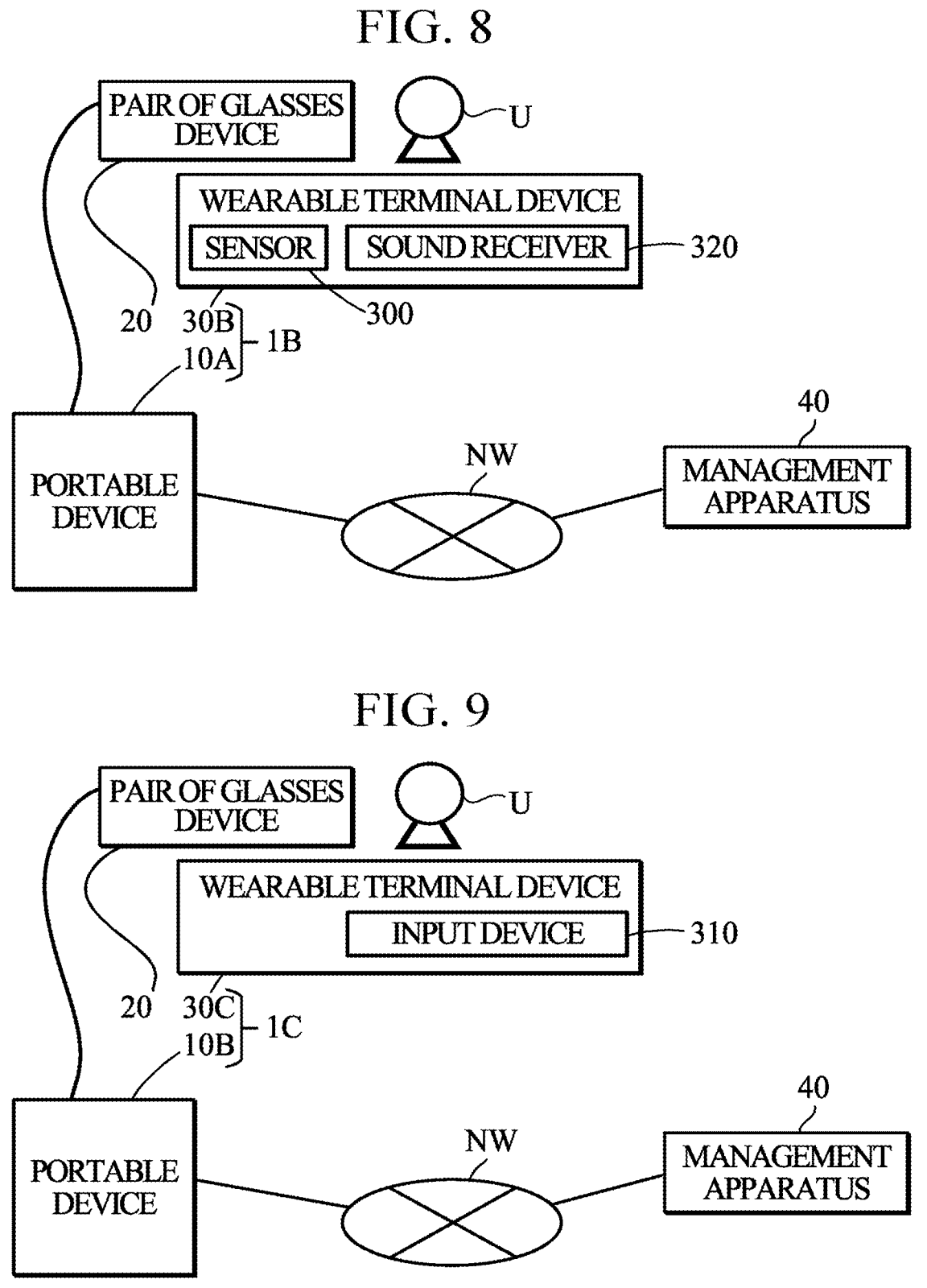

PAIR OF GLASSES DEVICE
U
WEARABLE TERMINAL DEVICE
SENSOR
SOUND RECEIVER
320
20
30B
10A
1B
300
40
NW
PORTABLE DEVICE
MANAGEMENT APPARATUS

FIG. 9

PAIR OF GLASSES DEVICE
U
WEARABLE TERMINAL DEVICE
INPUT DEVICE
310
20
30C
10B
1C
40
NW
PORTABLE DEVICE
MANAGEMENT APPARATUS

G2

VC

OP

VOB2

VOB1

TODAY' S NEWS
·POLITICS
·ECONOMICS
····

VOBP

DISPLAY CONTROL APPARATUS

TECHNICAL FIELD

This disclosure relates to display control apparatuses.

BACKGROUND ART

A head-mounted display (HMD) device to be worn on the head of a person is generally popular. As an example of the HMD device, a pair of glasses device such as a pair of augmented reality (AR) glasses may be mentioned. The pair of AR glasses displays an image of a virtual object, which does not exist in a real space, superimposed on the real space. A user of the pair of glasses device can select a virtual object displayed on the pair of glasses device to acquire information corresponding to the selected virtual object. An operation to select a virtual object is referred to as a ray-casting operation. The ray-casting operation includes an aiming operation, in which a virtual indicator such as a cursor is placed on a virtual object desired to be selected, and a determination operation in which the selection is determined.

As an example of a mode in which the ray-casting operation for the pair of glasses device is implemented, a mode may be mentioned in which a smartphone connected to the pair of glasses device is used as an operation device such as a 3D mouse. However, the mode in which a smartphone is used as an operation device has a problem in that a user is required to use one hand for the ray-casting operation. In addition, there is another problem in that the user is required to take out the smartphone to check a UI screen each time the ray-casting operation is to be performed and an incorrect operation such as pressing of a different button is likely to occur.

In the first place, as opposed to a 3D mouse, a smartphone does not have a shape and weight suitable for an operation device for a ray-casting operation. As a result, there is another problem in that it is difficult to finely move the smartphone used as the operation device in a frontward direction, in a rearward direction, in a leftward direction, in a rightward direction, in an upward direction, or in a downward direction; thus, the aiming operation is degraded. Thus, various techniques are proposed to enable a ray-casting operation for a pair of glasses device to be performed easily and accurately. As an example, a technique disclosed in Patent Document 1 is cited. Patent Document 1 discloses a technique in which a line of sight of a user is used for a ray-casting operation for a pair of glasses device. The technique in which a line of sight of a user is used for a ray-casting operation may be referred to as head position gaze (HPG).

RELATED ART DOCUMENT

Patent Document

Patent Document 1: Japanese Patent Application, Laid-Open Publication No. 2017-027206.

SUMMARY OF THE INVENTION

Problem to be Solved by the Invention

In HPG, there is a problem in that a user is required to gaze at a virtual object desired to be selected for a few seconds and waiting time, which is the few seconds, is required until the selection is determined. Additionally, in HPG, there is another problem in that an incorrect selection, such as selection of a virtual object to which a user unconsciously continues to direct a line of sight of the user, may frequently occur. To address these problems, it is conceivable that a pair of glasses device may be provided with a dedicated button for determination operation; however, there is a problem in that development cost and production cost of the pair of glasses device increase.

Means for Solving Problem

A display control apparatus according to a preferred mode of this disclosure includes a display controller and a determiner. The display controller is configured to cause a pair of glasses device to display one or more virtual objects included in a field of view of the pair of glasses device in a three-dimensional space. In addition, the display controller is configured to, based on a line of sight of a user of the pair of glasses device, cause the pair of glasses device to display a virtual indicator for selecting one virtual object from the one or more virtual objects. The determiner is configured to determine, to be a target for operation, a virtual object indicated by the virtual indicator at a point in time at which an input operation to a wearable terminal device worn on the body of the user is performed.

Effect of Invention

According to this disclosure, compared to a configuration in which "an operation to continue to gaze at a virtual object for a few seconds" is interpreted as a "determination operation," it is possible to determine a virtual object, which is a target for operation, rapidly and accurately. In addition, according to this disclosure, it is not necessary to provide a pair of glasses device with a dedicated button for the determination operation, and it is possible to prevent an increase in development cost and production cost of the pair of glasses device.

BRIEF DESCRIPTION OF THE DRAWINGS

FIG. 7 is a flowchart showing flows of a display control method executed by a processor 140 of the portable device 10A in accordance with a program PRA.

FIG. 8 is a block diagram showing an example of a configuration of a display system 1B according to a second embodiment of this disclosure.

FIG. 9 is a block diagram showing an example of a configuration of a display system 1C according to a third embodiment of this disclosure.

MODES FOR CARRYING OUT THE INVENTION

A. First Embodiment

Figures 1, 2:
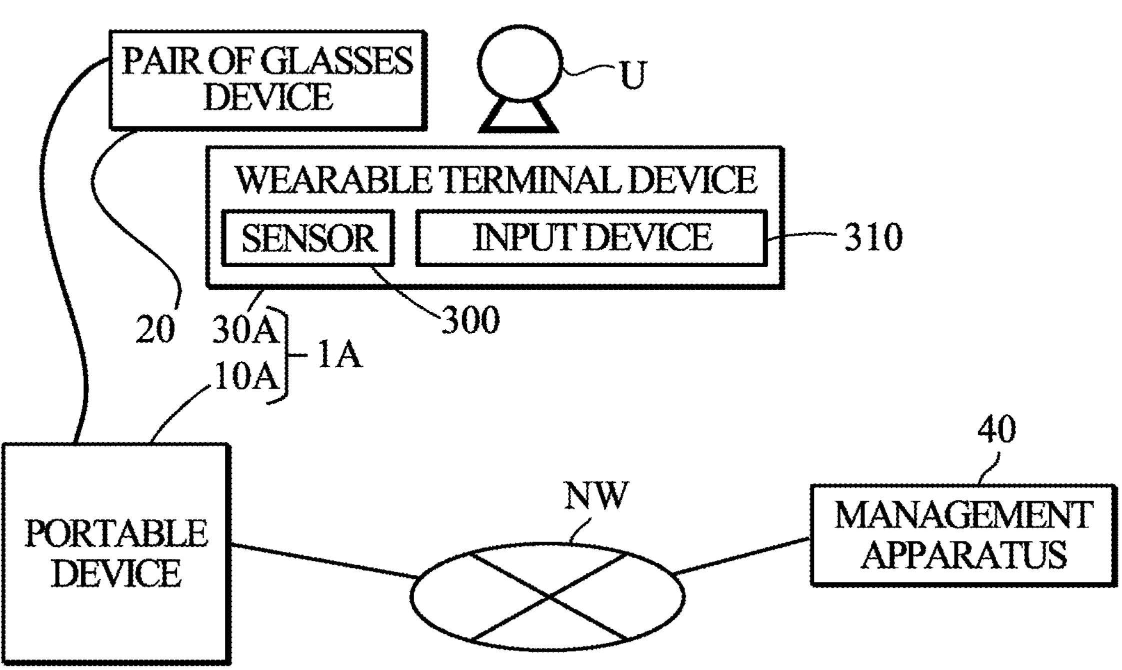
FIG. 1 is a block diagram showing an example of a configuration of a display system 1A according to a first embodiment of this disclosure.
FIG. 2 is a diagram showing an example of the arrangement of virtual objects in a region R.

FIG. 1 is a block diagram showing an example of a configuration of a display system 1A according to a first embodiment of this disclosure. As shown in FIG. 1, the display system 1A includes a portable device 10A, a pair of glasses device 20, and a wearable terminal device 30A. The pair of glasses device 20 is an HMD device that is to be worn on the head of a user U. The pair of glasses device 20 does not block a field of view of the user U wearing the pair of glasses device 20 on the head and displays an image of a virtual object that does not exist in a real space. Since the pair of glasses device 20 does not block the field of view of the user U, the user U visually recognizes the virtual object superimposed on the real space. The pair of glasses device 20 according to this embodiment, is a pair of AR glasses; however, it may be a pair of virtual reality (VR) glasses.

The portable device 10A is a smartphone, for example. The portable device 10A is not limited to a smart phone, and it may be a tablet or a laptop personal computer, for example. Similar to the pair of glasses device 20, the portable device 10A is worn on the body of the user U. For example, the portable device 10A hangs from the neck of the user U with a strap etc., to be worn on the body of the user U. The pair of glasses device 20 is connected by a wire to the portable device 10A. In addition, the wearable terminal device 30A is wirelessly connected to the portable device 10A.

The portable device 10A communicates with a management apparatus 40 via a communication line NW. The management apparatus 40 is a server that provides a content distribution service for AR. In the content distribution service according to this embodiment, a plurality of virtual objects is placed in a spherical region, which has a predetermined radius and has a center at the user U, and provision of information corresponding to a virtual object selected by the user, etc., are executed. The spherical region, in which the plurality of virtual objects is placed, is moved with movement of the user U. Thus, the user U can experience movement in the real space while being surrounded by the plurality of virtual objects.

The management apparatus 40 stores virtual object information and location information in advance. The virtual object information indicates images of the virtual objects placed in the spherical region having a center disposed at the user U. The location information indicates locations at which the virtual objects are placed in the region. The spherical region having a center disposed at the user U is an example of a three-dimensional space according to this disclosure. The location information according to this embodiment is information indicative of locations in a three-dimensional coordinate system having an origin disposed at the center of a spherical region R. Upon receipt of information indicative of starting the use of the content distribution service from the portable device 10A via the communication line NW, the management apparatus 40 transmits the virtual object information and the location information, which relate to each of the plurality of virtual objects, to the portable device 10A. The portable device 10A causes, based on the virtual object information and the location information received from the management apparatus 40, the pair of glasses device 20 to display an image to be viewed by the user U through the pair of glasses device 20 in the spherical region. The image to be viewed by the user U through the pair of glasses device 20 in the spherical region is referred to as an image corresponding to a field of view of the pair of glasses device 20. The image corresponding to the field of view of the pair of glasses device 20 is determined in accordance with an orientation of an optical axis of the pair of glasses device 20. The optical axis of the pair of glasses device 20 is an optical axis of the lens that guides an image light representing the real space to the eyes of the user U. The orientation of the optical axis of the pair of glasses device 20 is an example of an orientation of the pair of glasses device 20 according to this disclosure.

FIG. 2 is an overhead view of the spherical region R, in which virtual objects VOB1 to VOB6 are placed, viewed in a direction along a vertical axis. A point O shown in FIG. 2 corresponds to a location of the user U wearing the pair of glasses device 20, and an arrow S shown in FIG. 2 represents an orientation of the optical axis of the pair of glasses device 20 in a global coordinate system. When the pair of glasses device 20 is provided with a capturing function, the orientation of the optical axis of the pair of glasses device 20 can be specified by using a localization recognition service for AR in which an image captured by the imaging function is used. In addition, when the pair of glasses device 20 is provided with a sensor, such as a geomagnetic sensor, configured to provide information indicative of an absolute orientation in the global coordinate system, the orientation of the optical axis of the pair of glasses device 20 in the global coordinate system may be specified in accordance with output of the sensor.

The field of view of the pair of glasses device 20 denotes a range of a predetermined angle θ within the spherical region. The predetermined angle θ is an angle bisected by a line having a direction along the optical axis of the pair of glasses device 20. It should be noted that the predetermined angle θ is actually a solid angle. In an example shown in FIG. 2, a circular sector OAB corresponds to the field of view of the pair of glasses device 20. In the field of view of the pair of glasses device 20, one or more virtual object images may be included. In this embodiment, the image corresponding to the field of view of the pair of glasses device 20 is a projection image obtained by projecting a first image on a plane perpendicular to the arrow S. The first image is an image that is visually recognized when a first portion of the region R is viewed in a direction of the arrow S from the point O. The first portion of the region R is the range of the predetermined angle θ within the region R. The predetermined angle θ regarding the region R is an angle bisected by the arrow S. The portable device 10A generates the above-described projection image based on the virtual object information and the location information received from the management apparatus 40 and on the orientation of the optical axis of the pair of glasses device 20. The portable device 10A causes the pair of glasses device 20 to display the generated projection image.

Figure 3:
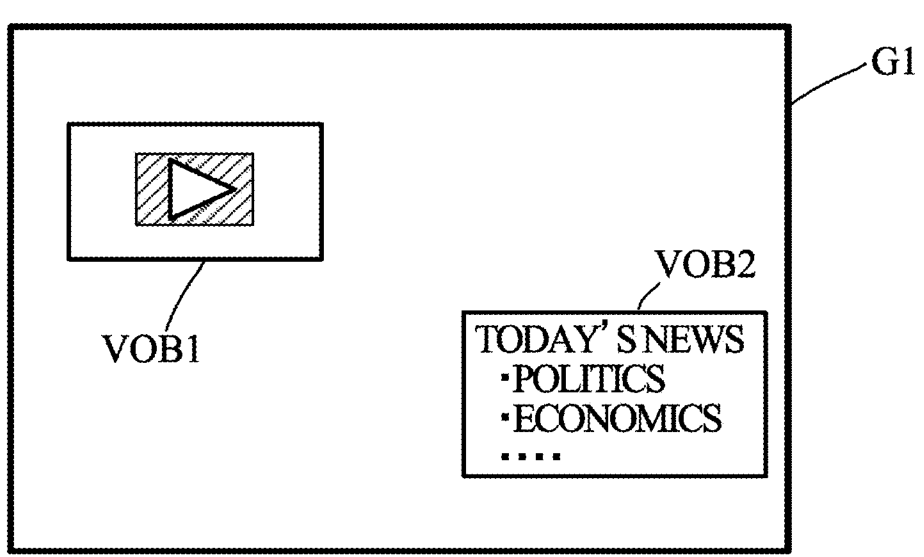
FIG. 3 is a diagram showing an example of a projection image G1.

In the example shown in FIG. 2, the virtual object VOB1 and the virtual object VOB2 are placed in the circular sector OAB. Thus, as shown in FIG. 3, the portable device 10A generates a projection image G1 in which an image of each of the virtual object VOB1 and the virtual object VOB2 is placed. The portable device 10A causes the pair of glasses device 20 to display the projection image G1. The projection image G1 has a transparent portion that does not correspond to either the virtual object VOB1 or the virtual object VOB2. The portable device 10A is an example of a display control apparatus according to this disclosure.

The virtual object VOB1 according to this embodiment is associated with video data. By determining the virtual object VOB1 to be a target for operation, the user U can view video indicated by the video data. In addition, the virtual object VOB2 according to this embodiment is associated with text data indicative of text of news relating to matters such as politics, economics, or sports. By determining the virtual object VOB2 to be the target for operation, the user U can cause the pair of glasses device 20 to display the text of the news.

Figure 4:
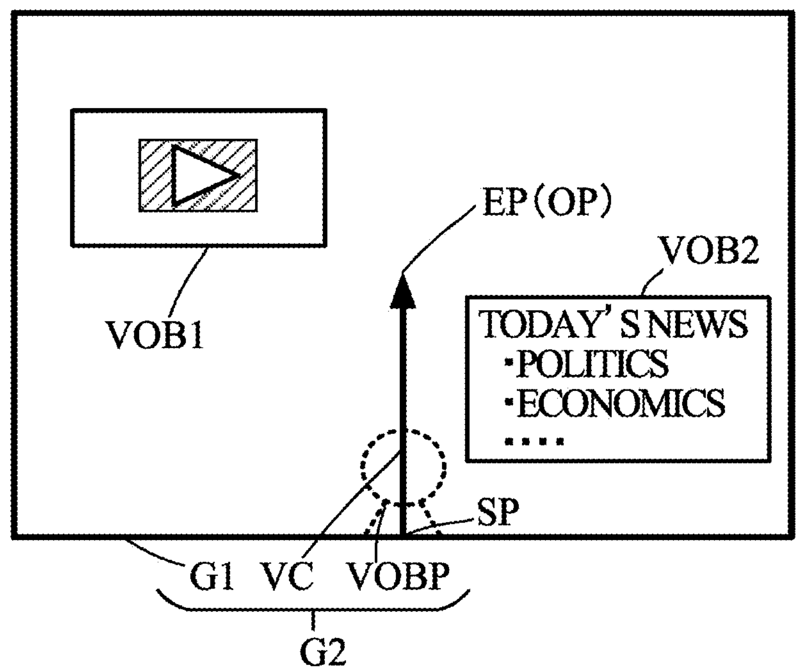
FIG. 4 is a diagram showing an example of an image G2 visually recognized by a user U wearing a pair of glasses device 20.

In addition, the portable device 10A causes the pair of glasses device 20 to display a virtual indicator VC superimposed on the projection image G1. The virtual indicator VC is used to cause the user U to select, as the target for operation, any one of the virtual objects displayed on the pair of glasses device 20. Since the virtual indicator VC superimposed on the projection image G1 is displayed on the pair of glasses device 20, an image G2 shown in FIG. 4 is visually recognized by the user U. The wearable terminal device 30A is a device for operating the virtual indicator VC displayed on the pair of glasses device 20.

As shown in FIG. 4, the virtual indicator VC according to this embodiment includes a starting point SP, which is placed at a predetermined point in the projection image G1, and an end point EP. The virtual indicator VC is an arrow-shaped line segment from the starting point SP toward the end point EP. The starting point SP according to this embodiment is the middle point of a lower side among four sides defining the periphery of the projection image G1, in other words, the middle point of a lower side among the two sides perpendicular to the vertical axis. The location of the middle point of the lower side of the projection image G1 is a location that is closest to a location of the center of the region R, in other words, to the location of the user U. Since the starting point SP of the virtual indicator VC is the middle point of the lower side of the projection image G1, it is possible to reduce a distortion in a direction of a line of sight of the user U caused by projecting a three-dimensional space on a two-dimensional plane. It should be noted that in this embodiment, the portable device 10A displays a virtual object VOBP corresponding to the user U at the location of the starting point SP as shown in FIG. 4; however, the display of the virtual object VOBP may be omitted.

In a state immediately after start of use of the content distribution service, the portable device 10A sets the end point EP of the virtual indicator VC at a center OP of the projection image G1. Thereafter, the portable device 10A updates the location of the end point EP of the virtual indicator VC in accordance with the location of, and with the orientation of, the wearable terminal device 30A in the global coordinate system. In other words, the location of the end point EP of the virtual indicator VC corresponds to a location indicated by the virtual indicator VC.

In the following, a location indicated by the virtual indicator VC immediately after start of use of the content distribution service is referred to as an initial indicated location. The reason for determining the center OP of the projection image G1 to be the initial indicated location is that the center OP corresponds to the center of the field of view of the user U wearing the pair of glasses device 20 and a line of sight of the user U is frequently disposed at the center of the field of view of the user U. In other words, the reason for determining the center OP to be the initial indicated location is that the virtual indicator VC is displayed in accordance with the line of sight of the user U. It should be noted that when the pair of glasses device 20 is provided with a function of detecting the location of the line of sight of the user U in its display region, the portable device 10A may determine a location detected by the function to be the initial indicated location.

The wearable terminal device 30A is worn on the body of the user of the pair of glasses device 20. In this embodiment, the wearable terminal device 30A is worn on a finger of, or on an arm of, the user of the pair of glasses device 20. The wearable terminal device 30A is, for example, a 3D mouse, a ring mouse, a smart ring, or a smart watch. The wearable terminal device 30A includes a sensor 300. The sensor 300 senses a change in location of, and a change in orientation of, the sensor 300 in the global coordinate system in accordance with movement of the finger or of the arm on which the wearable terminal device 30A is worn. The sensor 300 is, for example, a three-axis acceleration sensor and a three-axis angular velocity sensor.

When the user U moves the finger or the arm wearing the wearable terminal device 30A in a frontward direction, in a rearward direction, in a leftward direction, in a rightward direction, in an upward direction, or in a downward direction, the location of and the orientation of the wearable terminal device 30A is changed in the global coordinate system, and data corresponding to the changes is provided by the sensor 300. The wearable terminal device 30A transmits, as first operation contents data, the data provided by the sensor 300, to the portable device 10A. As will be described later, the portable device 10A updates the location indicated by the virtual indicator VC in accordance with the first operation contents data received from the wearable terminal device 30A.

Figure 5:
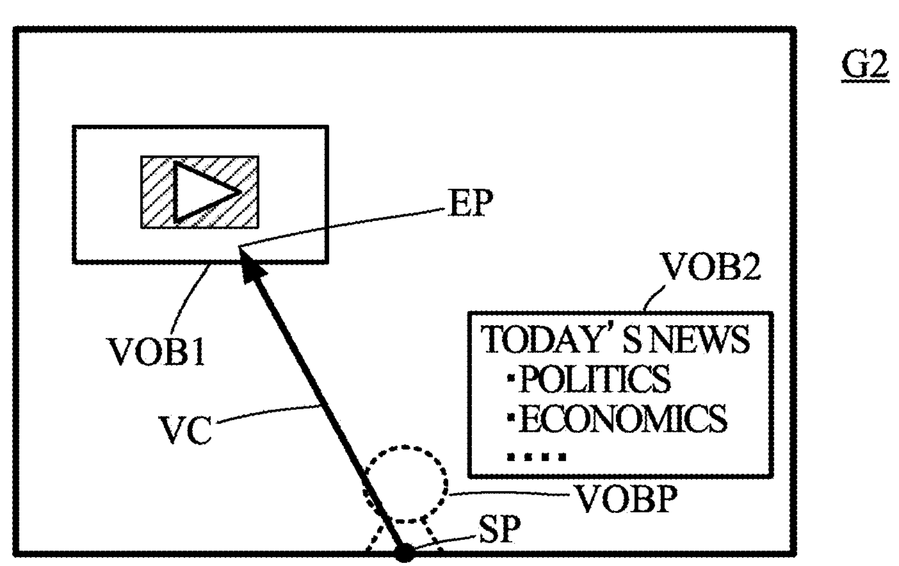
FIG. 5 is a diagram showing an example in which a location indicated by a virtual indicator VC is updated.

For example, when the user U imagines indicating the virtual object VOB1 using the wearable terminal device 30A and moves the wearable terminal device 30A from right to left, the location indicated by the virtual indicator VC is updated as shown in FIG. 5. FIG. 5 is a diagram showing an example of an image G2 visually recognized by the user U after the wearable terminal device 30A is moved from right to left. In this embodiment, an aiming operation is implemented by moving the wearable terminal device 30A in the frontward direction, in the rearward direction, in the leftward direction, in the rightward direction, in the upward direction, or in the downward direction. Thus, compared to a mode in which an aiming operation is implemented by moving the portable device 10A in the frontward direction, in the rearward direction, in the leftward direction, in the rightward direction, in the upward direction, or in the downward direction, it is possible to reduce the frequency of incorrect operations and to perform an aiming operation with high accuracy.

In addition, the wearable terminal device 30A includes an input device 310 configured to receive input operations by fingers of the user. The input device 310 includes a plurality of operable elements including a first operable element, a second operable element, and a third operable element. The first operable element corresponds to a start operation to start use of the content distribution service. The second operable element corresponds to a determination operation to determine a selection of a virtual object. The third operable element corresponds to a termination operation to terminate the use of the content distribution service. The user U can press any one of these operable elements to perform the start operation, the determination operation, or the termination operation. In this embodiment, the input device 310 is provided with the plurality of operable elements corresponding to the respective types of input operations; however, the input device 310 may be provided with a single operable element, and one of the respective input operations may be performed by holding down the single operable element or by continually pressing the single operable element 2 times, etc. The wearable terminal device 30A transmits second operation contents data, which indicates the contents of an input operation to the input device 310, to the portable device 10A. In this embodiment, the second operation contents data indicative of pressing of the first operable element indicates the start operation. In addition, the second operation contents data indicative of pressing of the second operable element indicates the determination operation. In addition, the third operation contents data indicative of pressing of the third operable element indicates the termination operation. As will be described later, the portable device 10A executes a process in accordance with the contents of the input operation indicated by the second operation contents data received from the wearable terminal device 30A.

Figure 6:
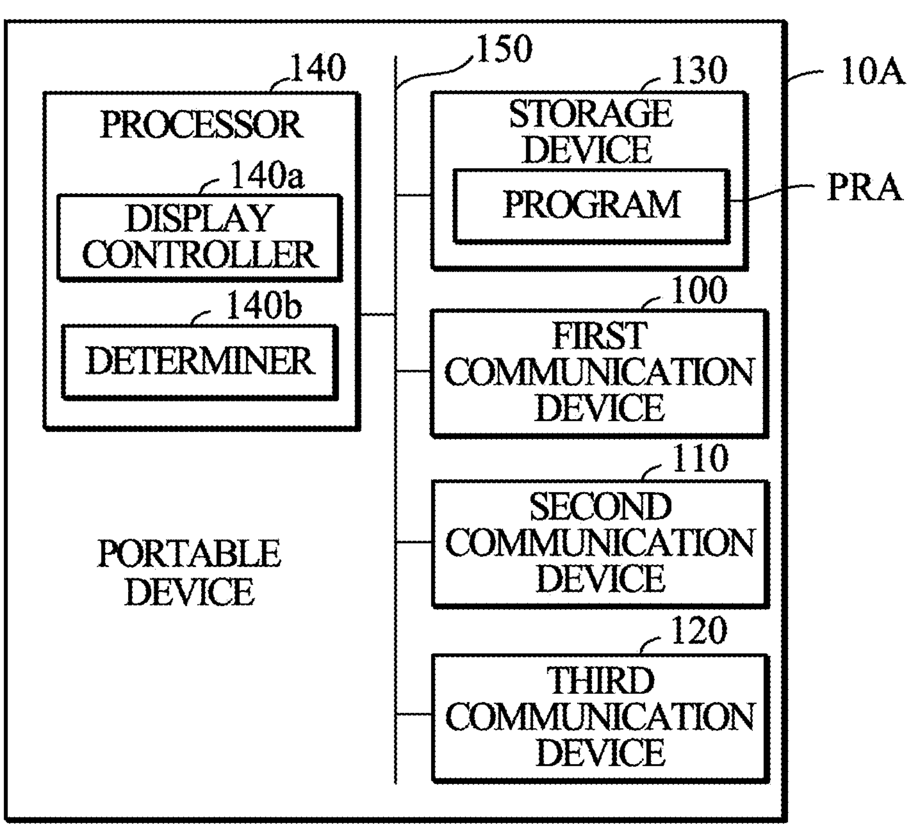
FIG. 6 is a block diagram showing an example of a configuration of a portable device 10A.

FIG. 6 is a block diagram showing an example of a configuration of the portable device 10A according to an embodiment of this disclosure. As shown in FIG. 6, the portable device 10A includes a first communication device 100, a second communication device 110, a third communication device 120, a storage device 130, a processor 140, and a bus 150. The first communication device 100, the second communication device 110, the third communication device 120, the storage device 130, and the processor 140 are connected to one another by the bus 150 for data exchange. The bus 150 may be constituted of a single bus or may be constituted of different buses that are each provided between devices.

The first communication device 100 is hardware (a transmitting and receiving device) configured to communicate with the management apparatus 40 via the communication line NW. The first communication device 100 may be referred to as a network device, a network controller, a network card, or a communication module, etc., for example. Under control of the processor 140, the first communication device 100 communicates with the management apparatus 40 to acquire the virtual object information and the location information.

The second communication device 110 is a communication module configured to communicate with the pair of glasses device 20 by wire. The second communication device 110 provides the processor 140 with data received from the pair of glasses device 20. In addition, the second communication device 110 transmits image data provided by the processor 140 to the pair of glasses device 20.

The third communication device 120 is a communication module configured to communicate with the wearable terminal device 30A wirelessly. The third communication device 120 provides the processor 140 with the first operation contents data and the second operation contents data received from the wearable terminal device 30A. It should be noted that the pair of glasses device 20 may be modified to a mode of communicating with the third communication device 120 wirelessly, and the second communication device 110 may be omitted in this mode. Similarly, the wearable terminal device 30A may be modified to a mode of communicating with the second communication device 110 by wire, and the third communication device 120 may be omitted in this mode.

The storage device 130 is a recording medium readable by the processor 140. The storage device 130 may be constituted of at least one of a read only memory (ROM), an erasable programmable ROM (EPROM), an electrically erasable programmable ROM (EEPROM), a random access memory (RAM), etc. The storage device 130 stores a program PRA in advance. Although not described in FIG. 6, the program PRA includes a transformation matrix for transforming a change in location and in orientation in the global coordinate system into a change in location and in orientation in a two-dimensional coordinate system defining locations in the display region of the pair of glasses device 20.

The processor 140 includes one or more central processing units (CPUs). Upon receipt of the second operation contents data indicative of the start operation from the wearable terminal device 30A, the processor 140 reads the program PRA from the storage device 130 to start executing the program PRA. The processor 140 operating in accordance with the program PRA functions as a display controller 140*a* and a determiner 140*b* shown in FIG. 6. In addition, upon receipt of the second operation contents data indicative of the termination operation from the wearable terminal device 30A, the processor 140 operating in accordance with the program PRA terminates the execution of the program PRA.

The display controller 140*a* and the determiner 140*b* shown in FIG. 6 are software modules that are implemented by a computer such as a CPU operating in accordance with software such as a program. The function of each of the display controller 140*a* and the determiner 140*b* is described below.

The display controller 140*a* uses the first communication device 100 to communicate with the management apparatus 40 to acquire the virtual object information and the location information. In addition, the display controller 140*a* uses the second communication device 110 to communicate with the pair of glasses device 20 to identify the orientation of the optical axis of the pair of glasses device 20, and causes the pair of glasses device 20 to display images of one or more virtual objects that are to be included in the field of view of the pair of glasses device 20. More particularly, the display controller 140*a* generates the above-described projection image for the range of the predetermined angle $\theta$ within the region R. The predetermined angle $\theta$ is an angle bisected by a line having a direction along the optical axis of the pair of glasses device 20 in the global coordinate system. In addition, the display controller 140*a* uses the second communication device 110 to transmit the image data indicative of the projection image to the pair of glasses device 20 to cause the pair of glasses device 20 to display the projection image.

In addition, the display controller 140*a* sets the center of the display region of the pair of glasses device 20, which is the center of the projection image, as the initial indicated location, and causes the pair of glasses device 20 to display the virtual indicator VC superimposed on the projection image. In addition, with each receipt of the first operation contents data via the third communication device 120, the display controller 140*a* uses the above-described transformation matrix to transform a change in location and in orientation indicated by the first operation contents data into a change in location and in orientation in the field of view of the pair of glasses device 20, which is a change in location and in orientation in the display region of the pair of glasses device 20. The display controller 140*a* adds the change in location and in orientation in the display region of the pair of glasses device 20 to a current indicated location to update the location indicated by the virtual indicator VC.

The determiner 140*b* determines a virtual object, which is indicated by the virtual indicator VC at a point in time at which the determination operation to the wearable terminal device 30A is performed, to be the target for operation. When the location indicated by the virtual indicator VC is included in an image corresponding to a virtual object, the virtual object is a virtual object indicated by the virtual indicator VC. When there is no virtual object indicated by the virtual indicator VC, in other words, when the location indicated by the virtual indicator VC is not included in any images corresponding to virtual objects, the determiner 140*b* determines no target for operation.

Figure 7:
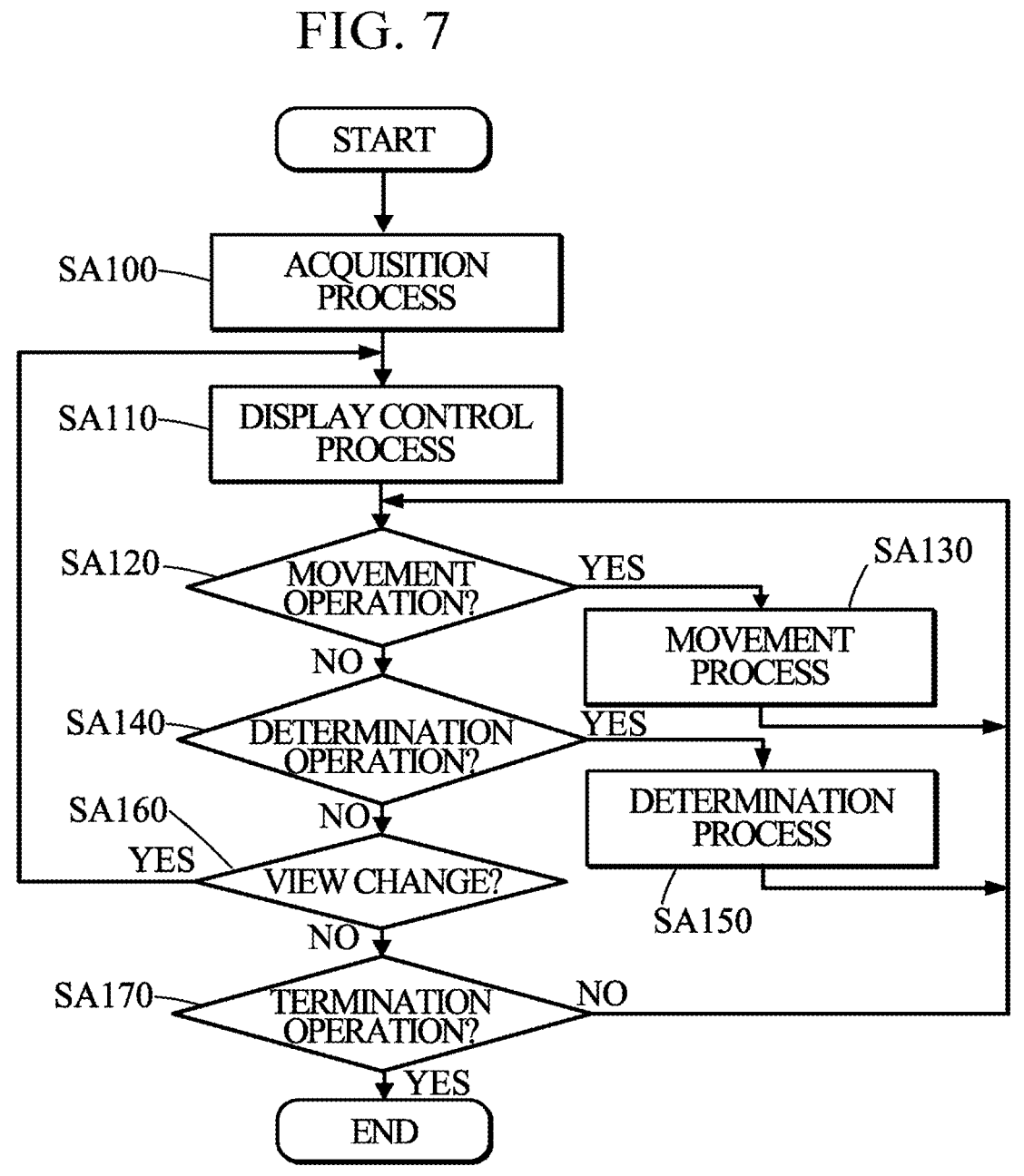

The processor 140 operating in accordance with the program PRA executes a display control method shown in FIG. 7. As shown in FIG. 7, this display control method includes processes constituted of step SA100 to step SA170. Details of each of the processes from step SA100 to step SA170 are described below.

At step SA100, the processor 140 functions as the display controller 140*a* and executes an acquisition process. In this acquisition process, the processor 140 communicates with the management apparatus 40 to acquire the virtual object information and the location information for each of the plurality of virtual objects to be placed in the spherical region R.

At step SA110 following step SA100, the processor 140 functions as the display controller 140*a* and executes a display control process. In this display control process, the processor 140 identifies the orientation of the optical axis of the pair of glasses device 20 and causes the pair of glasses device 20 to display images of one or more virtual objects to be included in the field of view of the pair of glasses device 20. Specifically, the processor 140 causes the pair of glasses device 20 to display the projection image for the range of the predetermined angle θ within the region R. The predetermined angle θ is an angle bisected by a line having a direction along the optical axis of the pair of glasses device 20 in the global coordinate system. In addition, the processor 140 sets the center of the projection image as the initial indicated location and causes the pair of glasses device 20 to display the virtual indicator VC superimposed on the projection image.

At step SA120 following step SA110, the processor 140 determines whether a movement operation has been performed. The movement operation denotes an operation to move a location indicated by the virtual indicator VC. At step SA120, upon receipt of the first operation contents data from the wearable terminal device 30A via the third communication device 120, the processor 140 determines that the movement operation has been performed. When the determination at step SA120 indicates "Yes", the processor 140 executes a process of step SA130 to execute the process of step SA120 again. On the other hand, when the determination at step SA120 indicates "No", the processor 140 executes a process of step SA140.

At step SA130, the processor 140 functions as the display controller 140*a* and executes a movement process. In this movement process, the processor 140 updates the location indicated by the virtual indicator VC in accordance with the change in location of and in orientation of the wearable terminal device 30A indicated by the first operation contents data.

At step SA140, the processor 140 determines whether the determination operation has been performed. The determination operation according to this embodiment is a press of the second operable element. At step SA140, upon receipt of the second operation contents data indicative of a press of the second operable element from the wearable terminal device 30A via the third communication device 120, the processor 140 determines that the determination operation has been performed. When the determination at step SA140 indicates "Yes", the processor 140 executes a process of step SA150 to execute the process of step SA120 again. When the determination at step SA140 indicates "No", the processor 140 executes a process of step SA160.

At step SA150, the processor 140 functions as the determiner 140*b* and executes a determination process. In this determination process, the processor 140 determines a virtual object, which is indicated by the virtual indicator VC at a point in time at which the determination operation to the wearable terminal device 30A is performed, to be the target for operation, and executes a process corresponding to the virtual object determined to be the target for operation. For example, when the virtual object VOB1 is determined to be the target for operation, the processor 140 plays back the video associated with the virtual object VOB1.

At step SA160, the processor 140 determines whether the field of view of the pair of glasses device 20 has been changed. At step SA160, when the orientation of the optical axis of the pair of glasses device 20 in the global coordinate system is changed, the processor 140 determines that the field of view of the pair of glasses device 20 has been changed. When the determination at step SA160 indicates "Yes", the processor 140 executes the process of step SA110 again. When the determination at step SA160 indicates "No", the processor 140 executes a process of step SA170.

At step SA170, the processor 140 determines whether the termination operation has been performed. The termination operation according to this embodiment is a press of the third operable element. At step SA170, upon receipt of the second operation contents data indicative of a press of the third operable element from the wearable terminal device 30A via the third communication device 120, the processor 140 determines that the termination operation has been performed. When the determination at step SA170 indicates "Yes", the processor 140 terminates the display control method. When the determination at step SA170 indicates "No", the processor 140 executes the process of step SA120 again.

As described above, according to this embodiment, the aiming operation is performed by moving the wearable terminal device 30A as an operation device in a frontward direction, in a rearward direction, in a leftward direction, in a rightward direction, in an upward direction, or in a downward direction. Thus, compared to a mode in which the portable device 10A is used as an operation device so as to perform an aiming operation, it is possible to reduce the frequency of incorrect operations and to perform an aiming operation accurately. In addition, according to this embodiment, a virtual object, which is indicated by the virtual indicator VC at a point in time at which the determination operation is performed by an input operation to the input device 310, is determined to be the target for operation. Thus, compared to a configuration in which "an operation to continue to gaze at a virtual object for a few seconds" is interpreted as a "determination operation," it is possible to determine a virtual object, which is a target for operation, rapidly and accurately.

B: Second Embodiment

FIG. 8 is a block diagram showing an example of a configuration of a display system 1B according to a second embodiment of this disclosure. In FIG. 8, elements that have the same configuration as elements shown in FIG. 1 are denoted by the same reference signs. As will be obvious by comparing FIG. 8 and FIG. 1, a configuration of the display system 1B differs from that of the display system 1A in that a wearable terminal device 30B is provided in place of the wearable terminal device 30A.

A configuration of the wearable terminal device 30B differs from that of the wearable terminal device 30A in that a sound receiver 320 is provided in place of the input device 310. The sound receiver 320 is, for example, a microphone, and receives sounds of the user. The wearable terminal device 30B transmits, as the second operation contents data, sound data indicative of a waveform of the sounds received by the sound receiver 320 to the portable device 10A. In this embodiment, a first keyword is assigned to the start operation, a second keyword is assigned to the determination operation, and a third keyword is assigned to the termination operation. The user U speaks keywords assigned to the respective input operations to perform the respective input operations. An example of the first keyword is "start", an example of the second keyword is "determination", and an example of the third keyword is "termination". The first keyword, the second keyword, and the third keyword may be freely set by the user U. In this embodiment, the second operation contents data indicative of a spoken sound of the first keyword denotes the start operation. In addition, the second operation contents data indicative of a spoken sound of the second keyword denotes the determination operation. In addition, the third operation contents data indicative of a spoken sound of the third keyword denotes the termination operation. In other words, this embodiment differs from the first embodiment in that the start operation, the determination operation, and the termination operation are performed by sound input.

In this embodiment, the wearable terminal device 30B is used as an operation device so as to perform the aiming operation. Thus, compared to a mode in which the portable device 10A is used as an operation device so as to perform the aiming operation, it is possible to reduce the frequency of incorrect operations and to perform an aiming operation accurately. In addition, according to this embodiment, a virtual object, which is indicated by the virtual indicator at a point in time at which the determination operation is performed by sound input to the sound receiver 320, is determined to be the target for operation. Thus, as in the first embodiment, it is possible to determine a virtual object, which is a target for operation, rapidly and accurately.

C: Third Embodiment

FIG. 9 is a block diagram showing an example of a configuration of a display system 1C according to a third embodiment of this disclosure. In FIG. 9, elements that have the same configuration as elements shown in FIG. 1 are denoted by the same reference signs. As will be obvious by comparing FIG. 9 and FIG. 1, a configuration of the display system 1C differs from that of the display system 1A in that a wearable terminal device 30C is provided in place of the wearable terminal device 30A and a portable device 10B is provided in place of the portable device 10A.

Figure 10:
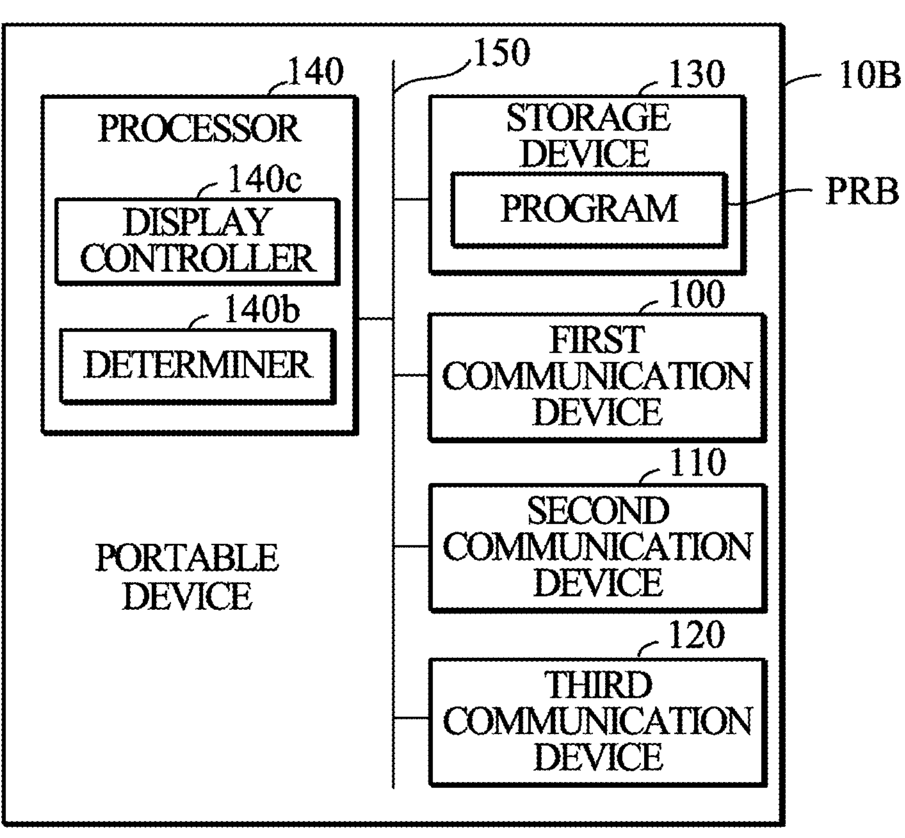
FIG. 10 is a block diagram showing an example of a configuration of a portable device 10B.

A configuration of the wearable terminal device 30C differs from that of the wearable terminal device 30A in that the sensor 300 is not included. FIG. 10 is a block diagram showing an example of a configuration of the portable device 10B. In FIG. 10, elements that have the same configuration as elements shown in FIG. 6 are denoted by the same reference signs. As will be obvious by comparing FIG. 10 and FIG. 6, the configuration of the portable device 10B differs from that of the portable device 10A in that, in place of the program PRA, a program PRB is stored in the storage device 130. In this embodiment, upon receipt of the second operation contents data indicative of the start operation from the wearable terminal device 30A, the processor 140 reads the program PRB from the storage device 130 to start executing the program PRB.

The program PRB differs from the program PRA in that the processor 140 operating in accordance with the program PRB functions as a display controller 140*c* and the determiner 140*b*. The display controller 140*c* is the same as the display controller 140*a* in that the virtual object information and the location information are acquired from the management apparatus 40, the image corresponding to the field of view of the pair of glasses device 20 is displayed on the pair of glasses device 20, and the virtual indicator VC is displayed on the pair of glasses device 20 by setting the center of the display region of the pair of glasses device 20 as the initial indicated location. The display controller 140*c* differs from the display controller 140*a* in that the location indicated by the virtual indicator VC is fixed to the initial indicated location. A fact that the location indicated by the virtual indicator VC is fixed to the center of the display region of the pair of glasses device 20 denotes that the location indicated by the virtual indicator VC is changed in accordance with a change in field of view of the pair of glasses device 20 (a change in orientation of the pair of glasses device 20). The display controller 140*c* changes the location indicated by the virtual indicator VC in accordance with a change in field of view of the pair of glasses device 20 (a change in orientation of the pair of glasses device 20) to implement display of the virtual indicator VC based on the line of sight of the user U wearing the pair of glasses device 20 on the head.

Figure 11:
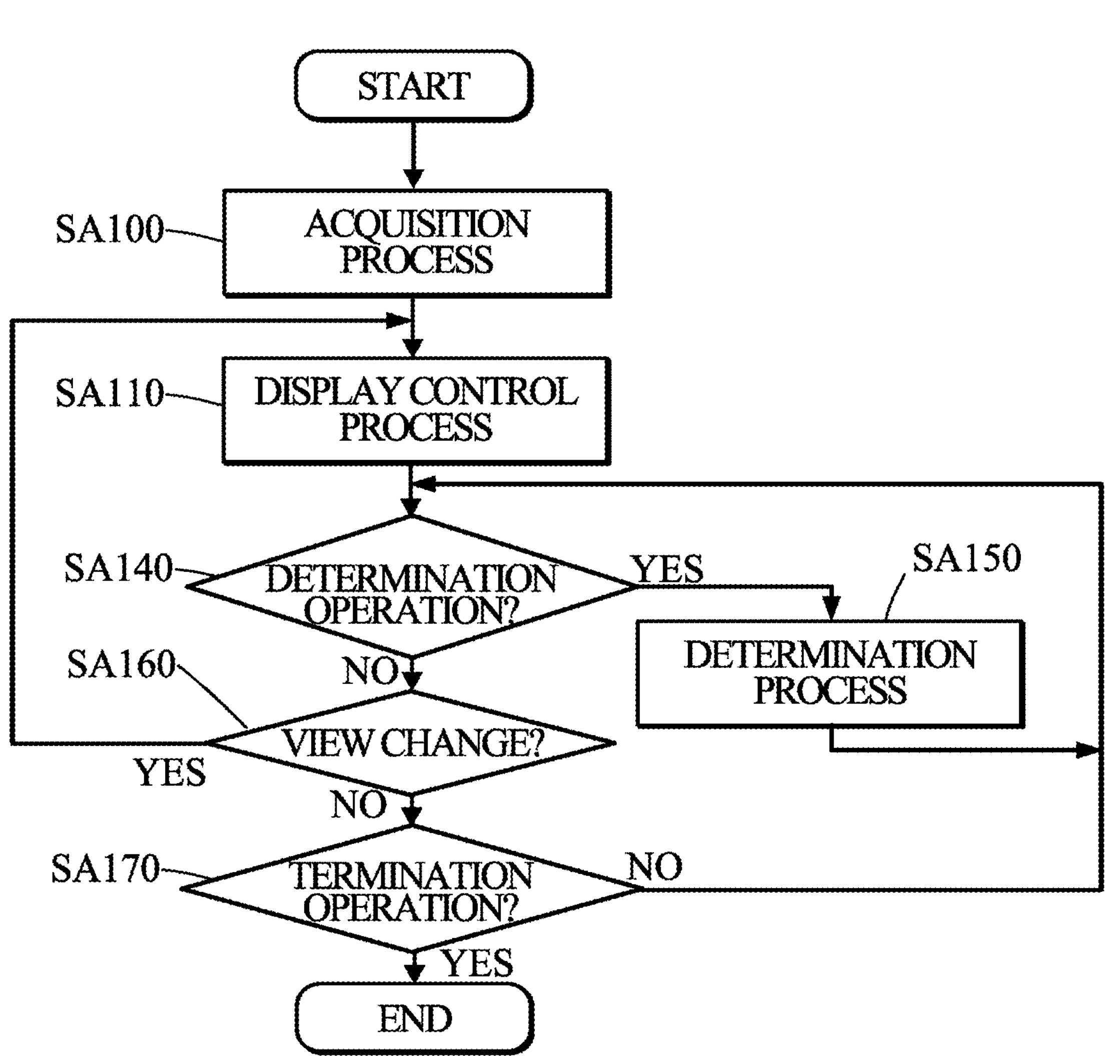
FIG. 11 is a flowchart showing flows of a display control method executed by the processor 140 of the portable device 10B in accordance with a program PRB.

In addition, the program PRB differs from the program PRA in that the processor 140 executes a display control method represented by a flow chart shown in FIG. 11. In FIG. 11, processes that are the same as processes shown in FIG. 7 are denoted by the same reference signs. As will be obvious by comparing FIG. 11 and FIG. 7, the display control method according to this embodiment differs from the display control method according to the first embodiment in that neither step SA120 nor step SA130 is included and step SA140 is executed next to step SA110. In this embodiment, the location indicated by the virtual indicator VC is changed in accordance with a change in field of view of the pair of glasses device 20 (a change in orientation of the pair of glasses device 20). Thus, an operation to change the field of view, such as movement of the head of the user U (an operation to change in orientation of the pair of glasses device 20) serves as the movement operation. Thus, in this embodiment, the respective processes of step SA120 and step SA130 are not required.

Figure 12:
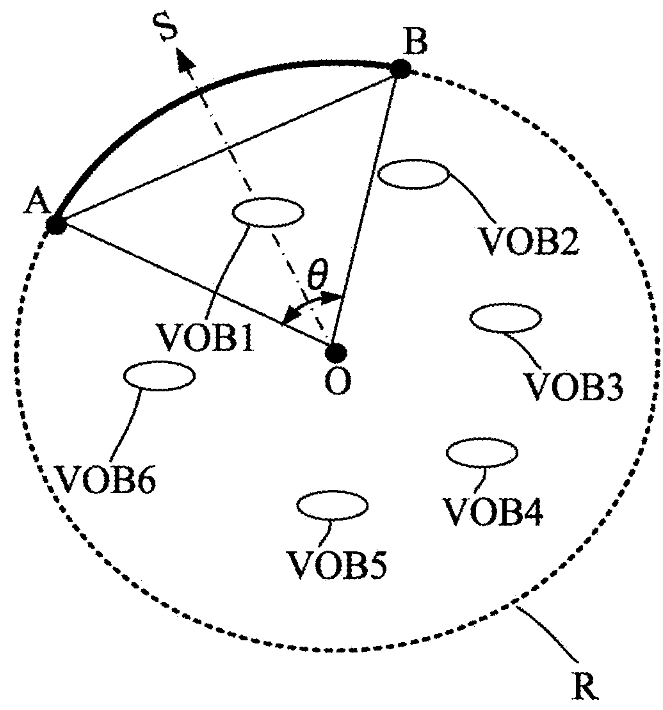
FIG. 12 is a diagram explaining an operation of the portable device 10B.
Figure 13:
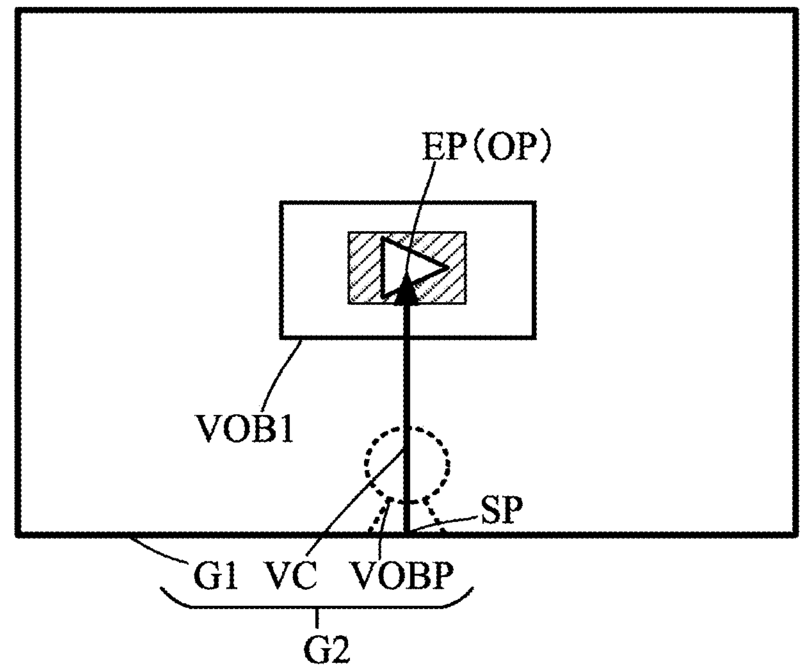
FIG. 13 is a diagram explaining an operation of the portable device 10B.

For example, it is assumed that in a state in which the image G2 shown in FIG. 4 is displayed on the pair of glasses device 20, the user U rotates the head from right to left such that the center of the display region of the pair of glasses device 20 overlaps the image of the virtual object VOB1. In this case, the field of view of the pair of glasses device 20 is changed as shown in FIG. 12. In FIG. 12, the circular sector OAB corresponds to the field of view of the pair of glasses device 20, as in FIG. 2. In a state shown in FIG. 12, in the field of view of the pair of glasses device 20, only the virtual object VOB1 is placed at the center of the field of view. The location indicated by the virtual indicator VC is fixed to the center of the display region of the pair of glasses device 20. Thus, the image G2 shown in FIG. 13 is displayed on the pair of glasses device 20.

In this embodiment, the aiming operation is implemented by moving the head wearing the pair of glasses device 20. Thus, compared to a mode in which the portable device 10B is used as an operation device so as to perform the aiming operation, it is possible to reduce the frequency of incorrect operations and to perform an aiming operation accurately. Additionally, in this embodiment, as in the first embodiment, a virtual object, which is indicated by the virtual indicator VC at a point in time at which the determination operation is performed by an input operation to the input device 310, is determined to be the target for operation. Thus, compared to a configuration in which "an operation to continue to gaze at a virtual object for a few seconds" is interpreted as a "determination operation," it is possible to determine a virtual object, which is a target for operation, rapidly and accurately.

In addition, in this embodiment, the display controller 140*c* may update, during a continuation of the determination operation, in other words, during a continuation of pressing the second operable element, a location of the virtual object determined to be the target for operation in the region R such that a display location of the virtual object on the pair of glasses device 20 is fixed even if the orientation of the pair of glasses device 20 is changed. According to this embodiment, the user U visually recognizes, during a continuation of the determination operation, movement of the virtual object determined to be the target for operation in a direction that is the same as a direction of movement of the head; thus, drag and drop of the virtual object is executed.

D: Fourth Embodiment

Figures 14, 15:
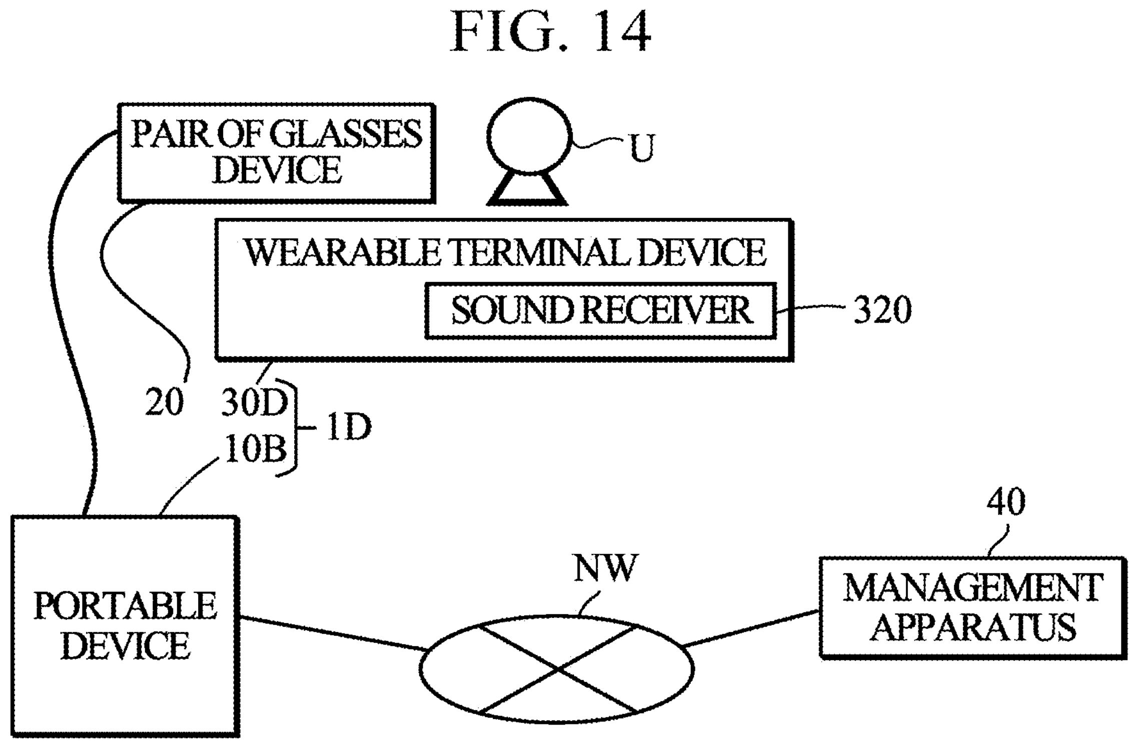
FIG. 14 is a block diagram showing an example of a configuration of a display system 1D according to a fourth embodiment of this disclosure.
FIG. 15 is a diagram showing an example of an image G2 visually recognized by the user U wearing the pair of glasses device 20 in a modification (1).

FIG. 14 is a block diagram showing an example of a configuration of a display system 1D according to a fourth embodiment of this disclosure. In FIG. 14, elements that have the same configuration as elements shown in FIG. 8 are denoted by the same reference signs. As will be obvious by comparing FIG. 14 and FIG. 8, a configuration of the display system 1D differs from that of the display system 1B in that a wearable terminal device 30D is provided in place of the wearable terminal device 30B and a portable device 10B is provided in place of the portable device 10A. A configuration of the wearable terminal device 30D differs from that of the wearable terminal device 30B in that the sensor 300 is not included.

In this embodiment, as in the third embodiment, the aiming operation is implemented by moving the head wearing the pair of glasses device 20. Thus, compared to a mode in which the portable device 10B is used as an operation device so as to perform the aiming operation, it is possible to reduce the frequency of incorrect operations and to perform an aiming operation with accuracy. Additionally, in this embodiment, as in the second embodiment, a virtual object, which is indicated by the virtual indicator at a point in time at which the determination operation is performed by sound input to the sound receiver 320, is determined to be the target for operation. Thus, it is possible to determine a virtual object, which is a target for operation, rapidly and accurately. It should be noted that in this embodiment, as in the third embodiment, the display controller 140*c* may update, during a continuation of the determination operation, in other words, during a continuation of pressing the second operable element, a location of the virtual object determined to be the target for operation in the region R such that a display location of the virtual object on the pair of glasses device 20 is fixed even if the orientation of the pair of glasses device 20 is changed.

E: Modifications

This disclosure is not limited to the first embodiment and the second embodiment described above. The following are specific examples of modifications. Two or more modifications freely selected from the following modifications may be combined.

E-1: Modification 1

Figure 16:
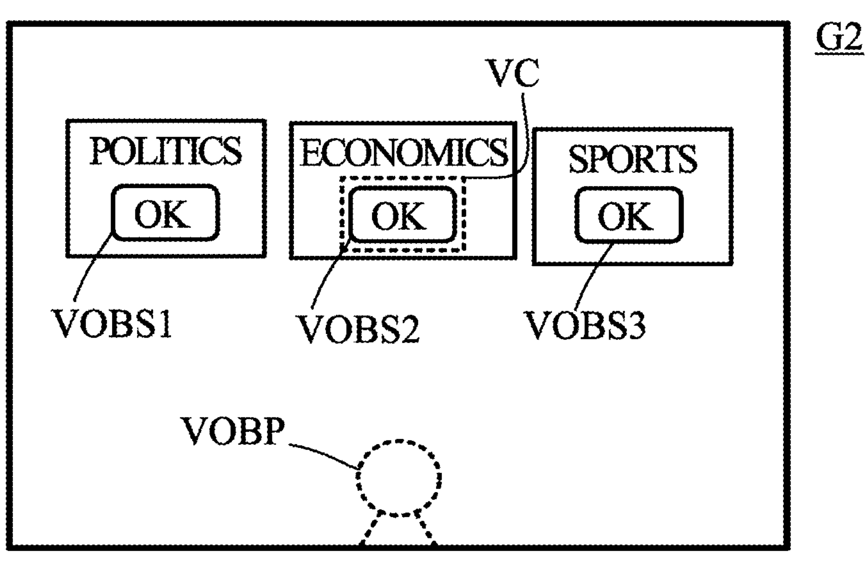
FIG. 16 is a diagram showing another example of an image G2 visually recognized by the user U wearing the pair of glasses device 20 in the modification (1).

The virtual indicator VC according to each of the above-described embodiments is a line segment that has a starting point fixed at a predetermined location in the display region of the pair of glasses device 20 and that has an end point that is an indicated point. However, as shown in FIG. 15, the virtual indicator VC according to this disclosure may be a figure such as a block-arrow displayed at an indicated location, as with a so-called mouse pointer. FIG. 15 is a diagram showing an example of an image G2 visually recognized by the user U in a case in which the figure of the block-arrow is used as the virtual indicator VC. In addition, when virtual objects to be selected by the user U are virtual buttons such as virtual objects VOBS1 to VOBS3 shown in FIG. 16, the virtual indicator VC may be a figure enclosing a virtual button as shown in FIG. 16. FIG. 16 is a diagram showing an example of an image G2 visually recognized by the user U in a case in which a quadrilateral enclosing a virtual button is used as the virtual indicator VC. When the virtual indicator VC is a figure enclosing a virtual button, an initial indicated location of the virtual indicator VC may be any one of the locations of the plurality of virtual buttons included in the projection image.

The user U may freely set a display mode of the virtual indicator. In addition, when the virtual objects placed in the region R are placed in a hierarchy, the portable device 10A and the portable device 100B may switch the display mode of the virtual indicator VC in accordance with the hierarchy of a virtual object displayed on the pair of glasses device 20. In the following, when there is no need to distinguish between the portable device 10A and the portable device 10B, each of the portable device 10A and the portable device 10B is referred to as a portable device 10. For example, in a state in which the pair of glasses device 20 displays a virtual object corresponding to a primary item of video, news, etc., the portable device 10 causes the pair of glasses device 20 to display the virtual indicator VC shown in FIG. 4 or in FIG. 15. In a state in which a virtual object for prompting a selection of a subordinate item of politics, economics, sports, etc., is displayed on the pair of glasses device 20 in response to selecting a virtual object of a primary item, the portable device 10 causes the pair of glasses device 20 to display the virtual indicator VC shown in FIG. 16.

E-2: Modification 2

The wearable terminal device 30A includes the sensor 300 configured to sense a change in location of, and a change in orientation of, the sensor 300. The portable device 10A detects a change in location of, and in orientation of, the wearable terminal device 30A in the global coordinate system based on the output of the sensor 300 and updates a location indicated by the virtual indicator VC in accordance with the change in location and in orientation of the wearable terminal device 30A. However, in a case in which the pair of glasses device 20 is provided with a function of detecting a location of the line of sight of the user U within the display region, the portable device 10A may update the location indicated by the virtual indicator VC in accordance with the location of the line of sight of the user U detected by the function. Even in a mode in which the location indicated by the virtual indicator VC is updated in accordance with the location of the line of sight of the user U, it is possible to determine a virtual object, which is a target for operation, rapidly and accurately as in the first embodiment as long as the determination operation is received by the input operation to the input device 310 in the mode. Similarly, when the second embodiment is modified into a mode in which the location indicated by the virtual indicator VC is updated in accordance with the line of sight of the user U, it is possible to determine a virtual object, which is a target for operation, rapidly and accurately, as long as the determination operation is received by sound input in the mode.

E-3: Modification 3

In the above-described first embodiment, drag and drop of the virtual object determined to be the target for operation may be implemented by moving the wearable terminal device 30A, or by moving the line of sight, while the determination operation is continued, in other words, while a press of the second operable element is continued. Similarly, in the second embodiment, drag and drop of the virtual object determined to be the target for operation may be implemented by moving the wearable terminal device 30B, or by moving the line of sight, while speaking of the second keyword is continued.

Additionally, in each of the first embodiment, the second embodiment, the third embodiment, and the fourth embodiment, when drag and drop of the virtual object determined to be the target for operation is performed, the location information stored in the management apparatus 40, in other words, the location of the virtual object in the region R may be updated by the portable device 10 notifying the management apparatus 40 of a location of the virtual object in the three-dimensional space after the drag and drop is performed. In addition, a single region R may be shared with a plurality of users U, and a change in display location of a virtual object caused by a user U may be reflected for the other users U.

E-4: Modification 4

In the above-described first embodiment and the second embodiment, the program PRA is stored in the storage device 130 of the portable device 10A; however, the program PRA may be produced or sold alone. An aspect of provision of the program PRA to a purchaser is, for example, an aspect in which a computer-readable recording medium such as a flash ROM having the program PRA written thereon is distributed, or an aspect in which the program PRA is distributed by downloading via a telecommunication line. Similarly, the program PRB may be produced or sold separately.

E-5: Modification 5

In the first embodiment and the second embodiment, each of the display controller **140*a* and the determiner 140*b* is a software module. However, one of, or each of, the display controller 140*a* and the determiner 140*b* may be a hardware module. The hardware module is, for example, a digital signal processor (DSP), an application specific integrated circuit (ASIC), a programmable logic device (PLD), a field programmable gate array (FPGA), etc. Even when one of, or each of, the display controller 140*a* and the determiner 140*b* is a hardware module, it is possible to provide advantages that are the same as advantages provided by the above-described first embodiment or the second embodiment. Similarly, in the third embodiment and the fourth embodiment, one of, or each of, the display controller 140*c* and the determiner 140*b* may be a hardware module. In addition, in the above-described embodiments, the start operation, the determination operation, and the termination operation are performed to the wearable terminal device worn on the body of the user U; however, the start operation and the termination operation may be performed to the portable device 10**, and the input operation performed to the wearable terminal may be only the determination operation.

F: Other Matters (1) In the above-described embodiments, a ROM, a RAM, etc., are shown as an example of the storage device 130; however, the storage device 130 may include flexible disks, magneto-optical disks (e.g., compact disks, digital multi-purpose disks, Blu-ray (registered trademark) discs, smart-cards, flash memory devices (e.g., cards, sticks, key drives), Compact Disc-ROMs (CD-ROMs), registers, removable discs, hard disks, floppy (registered trademark) disks, magnetic strips, databases, servers, or other suitable storage mediums.

(2) In the above-described embodiments, information, signals, etc., may be presented by use of various techniques. For example, data, instructions, commands, information, signals, bits, symbols, chips, etc., may be presented by freely selected combination of voltages, currents, electromagnetic waves, magnetic fields or magnetic particles, light fields or photons.

(3) In the above-described embodiments, the input and output of information, or the input or the output of information, etc., may be stored in a specific location (e.g., memory) or may be managed by use of a management table. The information, etc., that is, the input and output, or the input or the output, may be overwritten, updated, or appended. The information, etc., that is output may be deleted. The information, etc., that is input may be transmitted to other devices.

(4) In the above-described embodiments, determination may be made based on values that can be represented by one bit (0 or 1), may be made based on Boolean values (true or false), or may be made based on comparing numerical values (for example, comparison with a predetermined value).

(5) The order of processes, sequences, flowcharts, etc., that have been used to describe the above-described embodiments may be changed as long as they do not conflict. For example, although a variety of methods has been described in this disclosure with a variety of elements of steps in exemplary orders, the specific orders presented herein are by no means limiting.

(6) Each function shown in FIG. 6 or FIG. 10 is implemented by any combination of hardware and software. In addition, the method for realizing each functional block is not limited thereto. In other words, each functional block may be implemented by one device that is physically or logically aggregated. Alternatively, each functional block may be realized by directly or indirectly connecting two or more physically and logically separate, or physically or logically separate, devices (by using cables and radio, or cables, or radio, for example), and using these devices. The functional block may be realized by combining the software with one device described above or with two or more of these devices.

(7) The programs shown in the above-described embodiments should be widely interpreted as an instruction, an instruction set, a code, a code segment, a program code, a subprogram, a software module, an application, a software application, a software package, a routine, a subroutine, an object, an executable file, an execution thread, a procedure, a function, or the like, regardless of whether it is called software, firmware, middleware, microcode, hardware description language, or by other names.

In addition, software, instructions, etc., may be transmitted and received via communication media. For example, when software is transmitted by a website, a server, or other remote sources, by using wired technologies such as coaxial cables, optical fiber cables, twisted-pair cables, and digital subscriber lines (DSL), and wireless technologies such as infrared radiation and radio and microwaves by using wired technologies, or by wireless technologies, these wired technologies and wireless technologies, wired technologies, or wireless technologies, are also included in the definition of communication media.

(8) In each of the above-described embodiments, the terms "system" and "network" are used interchangeably.

(9) The information and parameters described in this disclosure may be represented by absolute values, may be represented by relative values with respect to predetermined values, or may be represented by using other pieces of applicable information.

(10) In the above-described embodiments, the portable device may be a mobile station (MS). A mobile station may be referred to, by one skilled in the art, as a "subscriber station," a "mobile object," a "subscriber unit," a "wireless unit," a "remote unit," a "mobile device," a "wireless device," a "wireless communication device," a "remote device," a "mobile subscriber station," an "access terminal," a "mobile terminal," a "wireless terminal," a "remote terminal," a "handset," a "user agent," a "mobile client," a "client," or some other suitable terms. In addition, the terms "mobile station", "user terminal", "user equipment (UE)", and "terminal" may be used interchangeably in this disclosure.

(11) In the above-described embodiments, the terms "connected" and "coupled", or any modification of these terms, may mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be replaced with "access." As used in this disclosure, two elements may be considered "connected" or "coupled" to each other by using one or more electrical wires, cables, and printed electrical connections, or by using one or more electrical wires, cables, or printed electrical connections. In addition, two elements may be considered "connected" or "coupled" to each other by using electromagnetic energy, etc., which is a non-limiting and non-inclusive example, having wavelengths in radio frequency regions, microwave regions, and optical (both visible and invisible) regions.

(12) In the above-described embodiments, the phrase "based on" as used in this specification does not mean "based only on," unless specified otherwise. In other words, the phrase "based on" means both "based only on" and "based at least on."

(13) The term "determining" used in this disclosure may mean a wide variety of operations. For example, the term "determining" may be used when practically "determining" that some act of judging, calculating, computing, processing, deriving, investigating, looking up, search, inquiry (for example, looking up, search, or inquiry a table, a database, or some other data structure), ascertaining, etc., has taken place. Furthermore, "determining" may be used when practically "determining" that some act of receiving (for example, receiving information), transmitting (for example, transmitting information), inputting, outputting, accessing (for example, accessing data in a memory) etc., has taken place. Furthermore, "determining" may be used when practically "determining" that some act of resolving, selecting, choosing, establishing, comparing, etc., has taken place. That is, "determining" may be used when practically determining to take some action. In addition, the term "determining" may be replaced with "assuming," "expecting," "considering," etc.

(14) When terms such as "include" and modifications thereof are used in the above-described embodiments, these terms are intended to be inclusive, in a manner similar to the way the term "comprise" is used. In addition, the term "or" as used in this disclosure is intended to be non-exclusive-OR.

(15) In this disclosure, for example, when articles such as "a," "an," and "the" in English are added in translation, these articles include plurals unless otherwise clearly indicated by the context.

(16) In this disclosure, the phrase "A and B are different" may mean "A and B are different from each other." Alternatively, the phrase "A and B are different from C" may mean that "each of A and B is different from C". Terms such as "separated" and "combined" may be interpreted in the same way as "different."

(17) The embodiments and the modifications described in this disclosure may be used individually or in combination, which may be altered depending on the mode of implementation. In addition, a predetermined piece of information (for example, a report to the effect that something is "X") does not necessarily have to be indicated explicitly, and it may be indicated in an implicit way (for example, by not reporting this predetermined piece of information, by reporting another piece of information, etc.).

G: Aspects Derivable From the Embodiment and the Modifications Described Above Although this disclosure is described in detail, it is obvious to those skilled in the art that the present invention is not limited to the embodiment described in the specification. This disclosure can be implemented with a variety of changes and in a variety of modifications, without departing from the spirit and scope of the present invention as defined in the recitations of the claims. Consequently, the description in this specification is provided only for the purpose of explaining examples and should by no means be construed to limit the present invention in any way. The following configurations are derivable from at least one of the embodiment and the modifications described above.

A display control apparatus according to a first aspect of this disclosure includes a display controller, and a determiner. The display controller is configured to cause a pair of glasses device to display one or more virtual objects included in a field of view of the pair of glasses device in a three-dimensional space and to, based on a line of sight of a user of the pair of glasses device, cause the pair of glasses device to display a virtual indicator for selecting one virtual object from the one or more virtual objects. The determiner is configured to determine, to be a target for operation, a virtual object indicated by the virtual indicator at a point in time at which an input operation to a wearable terminal device worn on a body of the user is performed.

According to the display control apparatus according to the first aspect, a virtual object, which is indicated by the virtual indicator at a point in time at which an input operation to the wearable terminal device is performed, is determined to be a target for operation. Thus, compared to a configuration in which "an operation to continue to gaze at a virtual object for a few seconds" is interpreted to be a "determination operation," it is possible to determine a virtual object, which is a target for operation, rapidly and accurately.

In addition, the display controller in the display control apparatus according to a second aspect (an example of the first aspect) of this disclosure may change a location indicated by the virtual indicator in accordance with a change in orientation of the pair of glasses device. According to the display control apparatus of the second aspect, a user wearing the pair of glasses device on the head can change an orientation of the head to update the location indicated by the virtual indicator.

In addition, the display controller in the display control apparatus according to a third aspect (an example of the second aspect) of this disclosure may update, during a continuation of the input operation, a location of the virtual object determined to be the target for operation in the three-dimensional space in accordance with the change in orientation of the pair of glasses device such that a display location of the virtual object determined to be the target for operation on the pair of glasses device is fixed. According to the third aspect, a user wearing the pair of glasses device on the head can drag and drop the virtual object determined to be the target for operation by moving the head while continuing the input operation.

In addition, in a fourth aspect (an example of the first aspect, an example of the second aspect, or an example of the third aspect) of this disclosure, the wearable terminal device includes an input device configured to receive input made by a finger of the user, and the determiner is configured to determine, based on data indicative of the input to the input device, whether the input operation is performed. According to the fourth aspect, a user can determine the virtual object to be the target for operation by input made by the finger.

In addition, in a fifth aspect (an example of the first aspect, an example of the second aspect, or an example of the third aspect) of this disclosure, the wearable terminal device includes a sound receiver, and the determiner is configured to determine, based on data indicative of a sound input to the sound receiver, whether the input operation is performed. According to the fifth aspect, a user can determine the virtual object to be the target for operation by sound input.

A display system according to a sixth aspect of this disclosure includes a pair of glasses device, a display control apparatus configured to cause the pair of glasses device to display one or more virtual objects included in a field of view of the pair of glasses device in a three-dimensional space, and a wearable terminal device connected to the display control apparatus and worn on a body of a user of the pair of glasses device. The display control apparatus is configured to cause, based on a line of sight of the user, the pair of glasses device to display a virtual indicator for selecting one virtual object from the one or more virtual objects. In addition, the display control apparatus is configured to determine, to be a target for operation, a virtual object indicated by the virtual indicator at a point in time at which an input operation to the wearable terminal device is performed. According to the display system according to the sixth aspect, similarly to the display control apparatus according to the first aspect, compared to a configuration in which "an operation to continue to gaze at a virtual object for a few seconds" is interpreted as a "determination operation," it is possible to determine a virtual object, which is a target for operation, rapidly and accurately.

DESCRIPTION OF REFERENCE SIGNS

1A, 1B, 1C, 1D . . . display system, 10A, 10B . . . portable device, 100 . . . first communication device, 110 . . . second communication device, 120 . . . third communication device, 130 . . . storage device, 140 . . . processor, 140*a* . . . display controller, 140*b* . . . determiner, 150 . . . bus, PRA, PRB . . . program, 20 . . . pair of glasses device, 30A, 30B, 30C, 30D . . . wearable terminal device, 300 . . . sensor, 310 . . . input device, 320 . . . sound receiver, 40 . . . management apparatus, NW . . . communication line.

The invention claimed is:

1. A display control apparatus comprising:

processing circuitry configured to cause a pair of glasses device to display one or more virtual objects included in a field of view of the pair of glasses device in a three-dimensional space and, based on a line of sight of a user of the pair of glasses device, cause the pair of glasses device to display a virtual indicator for selecting one virtual object from the one or more virtual objects; and determine, to be a target for operation, a virtual object indicated by the virtual indicator at a point in time at which an input operation to a wearable terminal device worn on a body of the user is performed, wherein the processing circuitry is configured to update, during a continuation of the input operation, a location of the virtual object determined to be the target for operation in the three-dimensional space in accordance with a change in orientation of the pair of glasses device such that a display location of the virtual object determined to be the target for operation on the pair of glasses device is fixed.

2. The display control apparatus according to claim 1, wherein the processing circuitry is configured to change a location indicated by the virtual indicator in accordance with the change in orientation of the pair of glasses device.

3. The display control apparatus according to claim 1, wherein the wearable terminal device includes an input device configured to receive input made by a finger of the user, and wherein the processing circuitry is configured to determine, based on data indicative of the input to the input device, whether the input operation is performed.

4. The display control apparatus according to claim 1, wherein the wearable terminal device includes a sound receiver, and wherein the processing circuitry is configured to determine, based on data indicative of a sound input to the sound receiver, whether the input operation is performed.

5. The display control apparatus according to claim 2, wherein the wearable terminal device includes an input device configured to receive input made by a finger of the user, and wherein the processing circuitry is configured to determine, based on data indicative of the input to the input device, whether the input operation is performed.

6. The display control apparatus according to claim 1, wherein the wearable terminal device includes an input device configured to receive input made by a finger of the user, and wherein the processing circuitry is configured to determine, based on data indicative of the input to the input device, whether the input operation is performed.

7. The display control apparatus according to claim 2, wherein the wearable terminal device includes a sound receiver, and wherein the processing circuitry is configured to determine, based on data indicative of a sound input to the sound receiver, whether the input operation is performed.

8. The display control apparatus according to claim 1, wherein the wearable terminal device includes a sound receiver, and wherein the processing circuitry is configured to determine, based on data indicative of a sound input to the sound receiver, whether the input operation is performed.

9. A method, implemented by processing circuitry of a display control apparatus, comprising:

causing a pair of glasses device to display one or more virtual objects included in a field of view of the pair of glasses device in a three-dimensional space and, based on a line of sight of a user of the pair of glasses device, causing the pair of glasses device to display a virtual indicator for selecting one virtual object from the one or more virtual objects; and determining, to be a target for operation, a virtual object indicated by the virtual indicator at a point in time at which an input operation to a wearable terminal device worn on a body of the user is performed, wherein the method includes updating, during a continuation of the input operation, a location of the virtual object determined to be the target for operation in the three-dimensional space in accordance with a change in orientation of the pair of glasses device such that a display location of the virtual object determined to be the target for operation on the pair of glasses device is fixed.

* * * * *